United States Patent
Osipychev (10) Patent No.: US 12,525,137 B2
(45) Date of Patent: Jan. 13, 2026

(54) COLLISION AVOIDANCE SYSTEM FOR AIRCRAFT AT AIRPORT

(71) Applicant: The Boeing Company, Arlington, VA (US)

(72) Inventor: Denis Osipychev, Huntsville, AL (US)

(73) Assignee: The Boeing Company, Arlington, VA (US)

( * ) Notice: Subject to any disclaimer, the term of this patent is extended or adjusted under 35 U.S.C. 154(b) by 322 days.

(21) Appl. No.: 18/155,659

(22) Filed: Jan. 17, 2023

(65) Prior Publication Data

US 2024/0242618 A1 Jul. 18, 2024

(51) Int. Cl.
| | |
|---|---|
| G08G 5/80 | (2025.01) |
| G06N 3/044 | (2023.01) |
| G08G 5/21 | (2025.01) |
| G08G 5/26 | (2025.01) |
| G08G 5/54 | (2025.01) |
| G08G 5/72 | (2025.01) |

(52) U.S. Cl.
CPC ............... *G08G 5/80* (2025.01); *G06N 3/044* (2023.01); *G08G 5/21* (2025.01); *G08G 5/26* (2025.01); *G08G 5/54* (2025.01); *G08G 5/723* (2025.01)

(58) Field of Classification Search
None
See application file for complete search history.

(56) References Cited

U.S. PATENT DOCUMENTS

| | | |
|---|---|---|
| 8,019,529 B1 | 9/2011 | Sharma et al. |
| 10,793,286 B1 | 10/2020 | Carrico et al. |
| 2010/0036551 A1* | 2/2010 | Lacaze ................. G05D 1/0676 244/187 |
| 2016/0247406 A1 | 8/2016 | Khatwa et al. |

(Continued)

FOREIGN PATENT DOCUMENTS

CN 114360300 A 4/2022

OTHER PUBLICATIONS

Wikipedia, Chain Rule (Probability), Jan. 3, 2023, all. (Year: 2023).*

(Continued)

*Primary Examiner* — James J Lee
*Assistant Examiner* — Tawri M Mcandrews
(74) *Attorney, Agent, or Firm* — Alleman Hall & Tuttle LLP (57) ABSTRACT

A computing system is configured to receive run-time position data for an intruder vehicle and run-time position data for an aircraft. A trajectory of the intruder vehicle is modeled based at least on the run-time position data for the intruder vehicle. A trajectory of the aircraft is modeled based at least on the run-time position data for the aircraft. The computing system is further configured to determine an intersection probability value that the trajectory of the intruder vehicle and the trajectory of the aircraft intersect. A behavior probability value that comprises a confidence level of a predicted behavior classification for the intruder vehicle is determined based at least on the run-time position data for the intruder vehicle and the run-time position data for the aircraft. Based at least on the intersection probability value and the behavior probability value, the computing system is configured to output a recommended collision avoidance action.

20 Claims, 6 Drawing Sheets

(56) References Cited

U.S. PATENT DOCUMENTS

| | | | |
|---|---|---|---|
| 2018/0357911 A1 | 12/2018 | Chartier et al. | |
| 2020/0023836 A1* | 1/2020 | Schneider | B60W 50/16 |
| 2020/0258404 A1* | 8/2020 | Thompson | G08G 5/56 |
| 2021/0150922 A1* | 5/2021 | Kanagarajan | G08G 5/22 |
| 2021/0256858 A1* | 8/2021 | Gupta | G08G 5/80 |
| 2022/0020280 A1* | 1/2022 | Mccullen | G06N 3/045 |
| 2023/0245575 A1 | 8/2023 | Osipychev et al. | |
| 2023/0386352 A1* | 11/2023 | Nagonda | G08G 5/80 |

OTHER PUBLICATIONS

European Patent Office, Extended European Search Report Issued in Application No. 23210286, Apr. 19, 2024, 12 pages.

Zhang, X. et al., "Airport surface movement prediction and safety assessment with spatial-temporal graph convolutional neural network," Transportation Research Part C: Emerging Technologies, vol. 144, Nov. 2022, 32 pages.

* cited by examiner

COLLISION AVOIDANCE SYSTEM FOR AIRCRAFT AT AIRPORT

STATEMENT REGARDING FEDERALLY SPONSORED RESEARCH OR DEVELOPMENT

This invention was made with Government support under contract FA8750-18-C-0093 awarded by the Defense Advanced Research Projects Agency (DARPA). The Government has certain rights in this invention.

BACKGROUND

At controlled airports, air traffic controllers maintain a safe operating environment by keeping aircraft separated from each other and from ground vehicles. In some examples, an airplane is not allowed to take off or land until all other aircraft and ground vehicles are clear of its designated runway. At uncontrolled airports, pilots and ground crew may communicate amongst themselves to coordinate approach procedures, departure procedures, traffic patterns, and other maneuvers. This prevents aircraft from colliding with each other or with a ground vehicle.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to avoiding collisions between an aircraft and another vehicle. One disclosed example provides a computing system. The computing system comprises a processor and a memory storing instructions executable by the processor. The instructions are executable by the processor to receive run-time position data for an intruder vehicle and to receive run-time position data for an aircraft. A trajectory of the intruder vehicle is modeled based at least on the run-time position data for the intruder vehicle. A trajectory of the aircraft is modeled based at least on the run-time position data for the aircraft. The computing system is further configured to determine an intersection probability value that the trajectory of the intruder vehicle and the trajectory of the aircraft intersect based at least on the run-time position data for the intruder vehicle and the run-time position data for the aircraft. A behavior probability value that comprises a confidence level of a predicted behavior classification for the intruder vehicle is determined based at least on the run-time position data for the intruder vehicle and the run-time position data for the aircraft. Based at least on the intersection probability value and the behavior probability value, the computing system is configured to output a recommended collision avoidance action.

DETAILED DESCRIPTION

At controlled airports, air traffic controllers maintain a safe operating environment by keeping aircraft separated from each other and from ground vehicles. In some examples, an airplane is not allowed to take off or land until all other aircraft and ground vehicles are clear of its designated runway. This ensures that aircraft maintain an appropriate separation distance to other aircraft and ground vehicles.

Operating at uncontrolled airports, which lack direct observation by an air traffic control tower, is more challenging. At uncontrolled airports, pilots and ground crew may communicate amongst themselves to coordinate approach procedures, departure procedures, traffic patterns, and other maneuvers. Pilots also consult airport diagrams, terminal procedure publications, and other resources. However, pilots at uncontrolled airports rely on their own judgment, and that of others in the air and on the ground, to avoid collisions.

Accordingly, examples are disclosed that relate to collision avoidance systems and methods. The disclosed examples can help to prevent collisions at uncontrolled airports, for example. Briefly, run-time position data is received for an intruder vehicle and for an aircraft. A trajectory of the intruder vehicle is modeled based at least on the run-time position data for the intruder vehicle. A trajectory of the aircraft is modeled based at least on the run-time position data for the aircraft. Based at least on the run-time position data for the intruder vehicle and the run-time position data for the aircraft, an intersection probability value is determined that represents a probability that the trajectory of the intruder vehicle and the trajectory of the aircraft intersect. A behavior probability value is determined that comprises a confidence level of a predicted behavior classification for the intruder vehicle based at least on the run-time position data for the intruder vehicle and the run-time position data for the aircraft. A recommended collision avoidance action is output based at least on the intersection probability value and the behavior probability value. This helps maintain a suitable separation distance that prevents the aircraft from colliding with the intruder vehicle.

Figure 1:
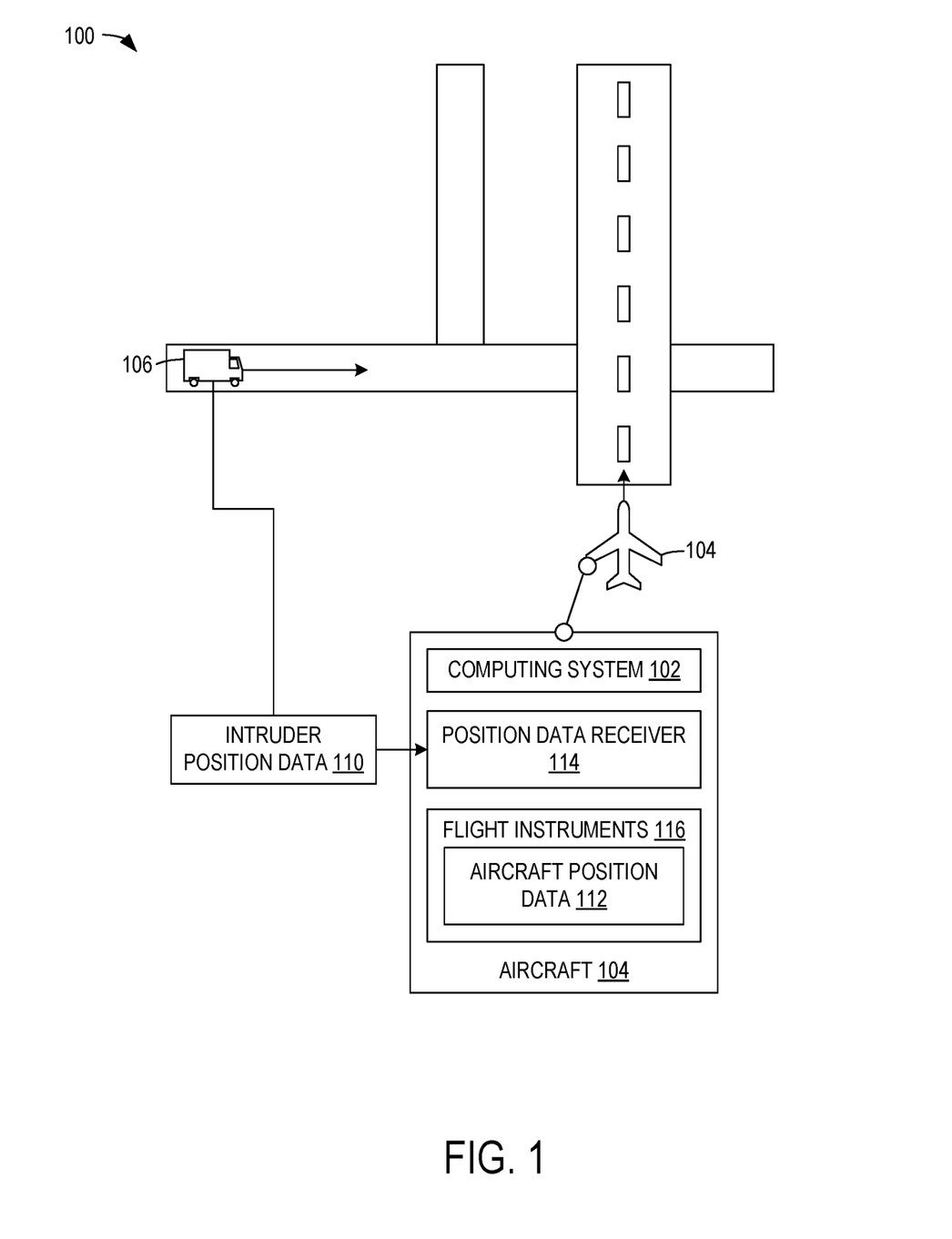
FIG. 1 schematically illustrates an example of a collision avoidance system including a computing system.

FIG. 1 shows an example of a system 100 for outputting a recommended collision avoidance action. The system 100 comprises a computing system 102. The computing system 102 comprises a processor and a memory storing instructions executable by the processor. The instructions are executable to implement the methods and processes described herein.

In some examples, the computing system 102 is on an aircraft 104. In some such examples, the computing system 102 comprises a laptop computing device, a tablet computing device, or a mobile computing device (e.g., a smartphone) located on the aircraft. In other examples, the computing system 102 comprises a flight management system or any other suitable avionics system integrated with an aircraft 104. In this manner, the computing system 102 may implement the methods and processes described herein at the aircraft. This can provide greater resiliency than performing the methods and processes described herein at a remote computing device, as it can be challenging for aircraft to communicate with remote computing devices at times, such as when operating in remote environments.

In yet other examples, the computing system 102 comprises any other suitable computing system. Another example of a suitable computing system includes, but is not limited to, a server computing device located at a ground station (e.g., a datacenter). In this manner, at least a portion of the methods and processes disclosed herein are offloaded from the aircraft.

The computing system 102 poses collision avoidance as a data-driven object detection problem. The computing system 102 is configured to identify a possible collision by analyzing a dynamic state of the aircraft 104 and an intruder vehicle 106. In some examples, the intruder vehicle comprises a ground vehicle. Some examples of suitable ground vehicles include, but are not limited to, a truck and a car. In other examples, the intruder vehicle comprises any other suitable type of vehicle. Some examples of other suitable types of vehicles include, but are not limited to, other aircraft (e.g., airplanes, helicopters, and drones). In this manner, the computing system may help to mitigate collision risks.

Figure 2:
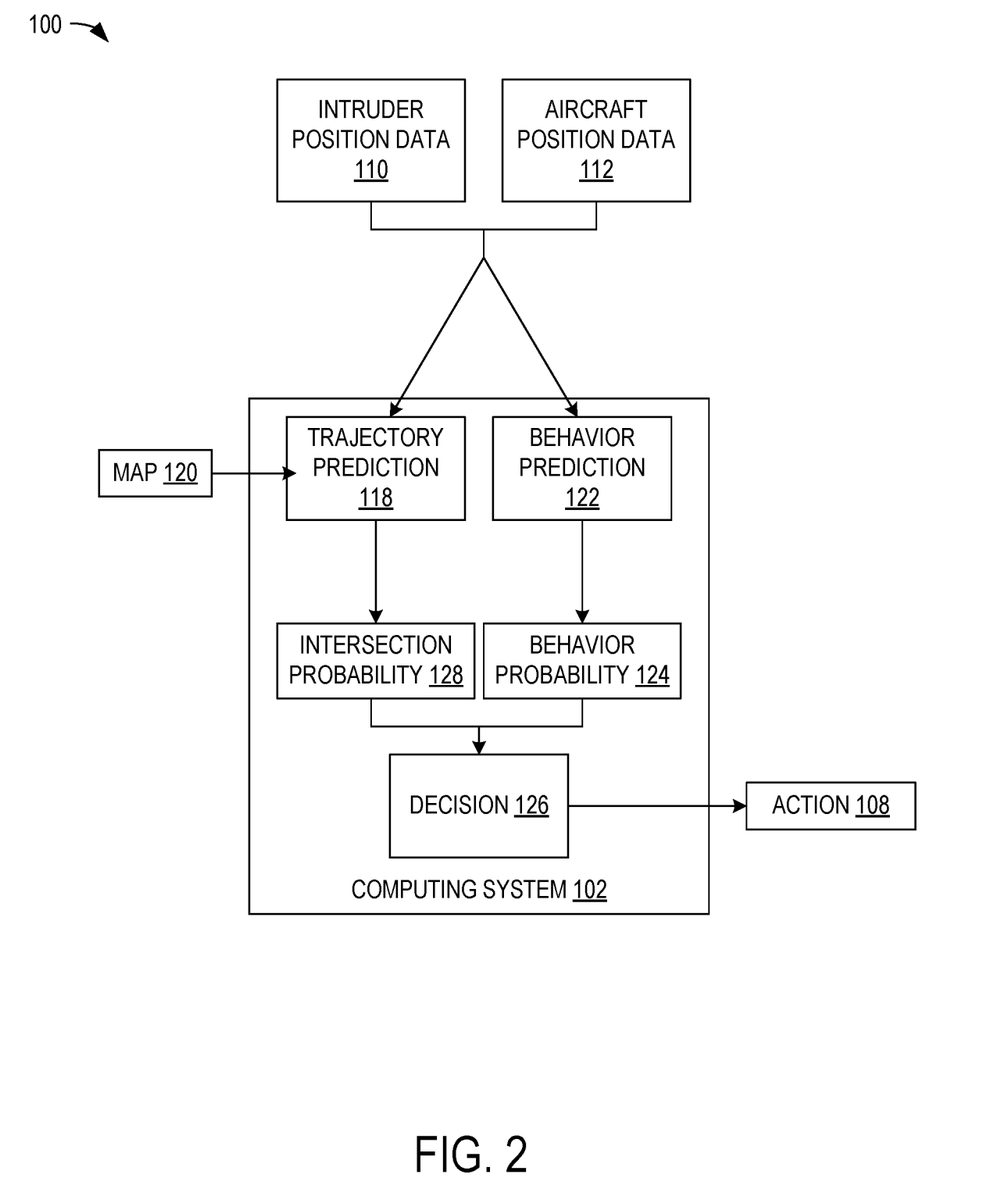
FIG. 2 shows the computing system of FIG. 1.

In some examples, as illustrated in FIG. 2, the computing system 102 implements a Markov decision process framework to output a recommended collision avoidance action 108. In the example of FIG. 2, states of the aircraft 104 and the intruder vehicle 106 are represented by position data (e.g., latitude, longitude, heading, and/or speed). During a run-time implementation of the collision avoidance system 100, the computing system 102 is configured to receive run-time position data 110 for the intruder vehicle 106 and to receive run-time position data 112 for the aircraft 104. As described in more detail below, the computing system 102 is trained to use the run-time position data 110 for the intruder vehicle 106 and the run-time position data 112 for the aircraft 104 to output the recommended collision avoidance action 108.

In some examples, the run-time position data 110 for the intruder vehicle 106 comprises transponder data received from a ground vehicle. For example, the aircraft 104 of FIG. 1 comprises a position data receiver 114. The position data receiver 114 is configured to receive the transponder data from the ground vehicle. In other examples, the run-time position data 110 for the intruder vehicle 106 comprises an output of a convolutional model based on image data. For example, image data of an airport may be obtained from a camera located on the aircraft. The image data may be input into the convolutional model to thereby cause the convolutional model to output the run-time position data for one or more vehicles located at the airport. In this manner, the computing system may obtain position data for any vehicles that lack a transponder compatible with the position data receiver.

In some examples, the computing system 102 is further configured to receive run-time position data for a plurality of intruder vehicles. In this manner, the computing system 102 may help to mitigate collision risks posed by the plurality of intruder vehicles.

Further, in some examples, the run-time position data 112 for the aircraft 104 is received from one or more flight instruments 116 on the aircraft. For example, the run-time position data 112 may comprise global positioning system (GPS) data. In other examples, the run-time position data 112 is determined using one or more other flight instruments, such as a heading indicator, an airspeed indicator, and an attitude indicator. In this manner, the computing system 102 is configured to obtain the run-time position data 112 for the aircraft 104.

With reference again to FIG. 2, the computing system 102 further comprises a trajectory prediction module 118 configured to model a trajectory of the intruder vehicle 106 based at least on the run-time position data 110 for the intruder vehicle. The trajectory prediction module 118 also models a trajectory of the aircraft 104 based at least on the run-time position data 112 for the aircraft 104. In some examples, the trajectories are further modeled based upon a map 120 of an airport. For example, the trajectory of the intruder vehicle 106 may be based upon constraints prescribed by the map 120, such as locations where ground vehicles can turn and distances between a ground vehicle to intersections and runway thresholds. In this manner, the map 120 may guide the determination of the trajectory of the intruder vehicle 106.

In some examples, the trajectory prediction module 118 comprises a deterministic model. For example, the trajectory of the aircraft 104 may be a predetermined function of a ground speed and a heading of the aircraft 104. In other examples, the trajectory prediction module 118 comprises a machine learning model trained to output the trajectory of the intruder vehicle and/or the trajectory of the aircraft.

The computing system 102 is further configured to output an intersection probability value 128. The intersection probability value 128 represents a probability that the trajectory of the intruder vehicle 106 and the trajectory of the aircraft 104 intersect. As described in more detail below, the intersection probability value 128 is used to determine whether to output a recommended collision avoidance action.

The computing system 102 further comprises a behavior prediction module 122. The behavior prediction module 122 is configured to output a behavior probability value 124. The behavior probability value 124 comprises a confidence level of a predicted behavior classification for the intruder vehicle 106.

In some examples, the behavior prediction module 122 comprises a neural network classifier. The neural network classifier can be trained to output a binary classification based at least on the run-time position data 110 for the intruder vehicle and the run-time position data 112 for the aircraft. The binary classification represents a prediction that the aircraft 104 and the intruder vehicle 106 will collide or not. Accordingly, the behavior probability value 124 comprises a confidence score for the predicted classification.

Figure 3:
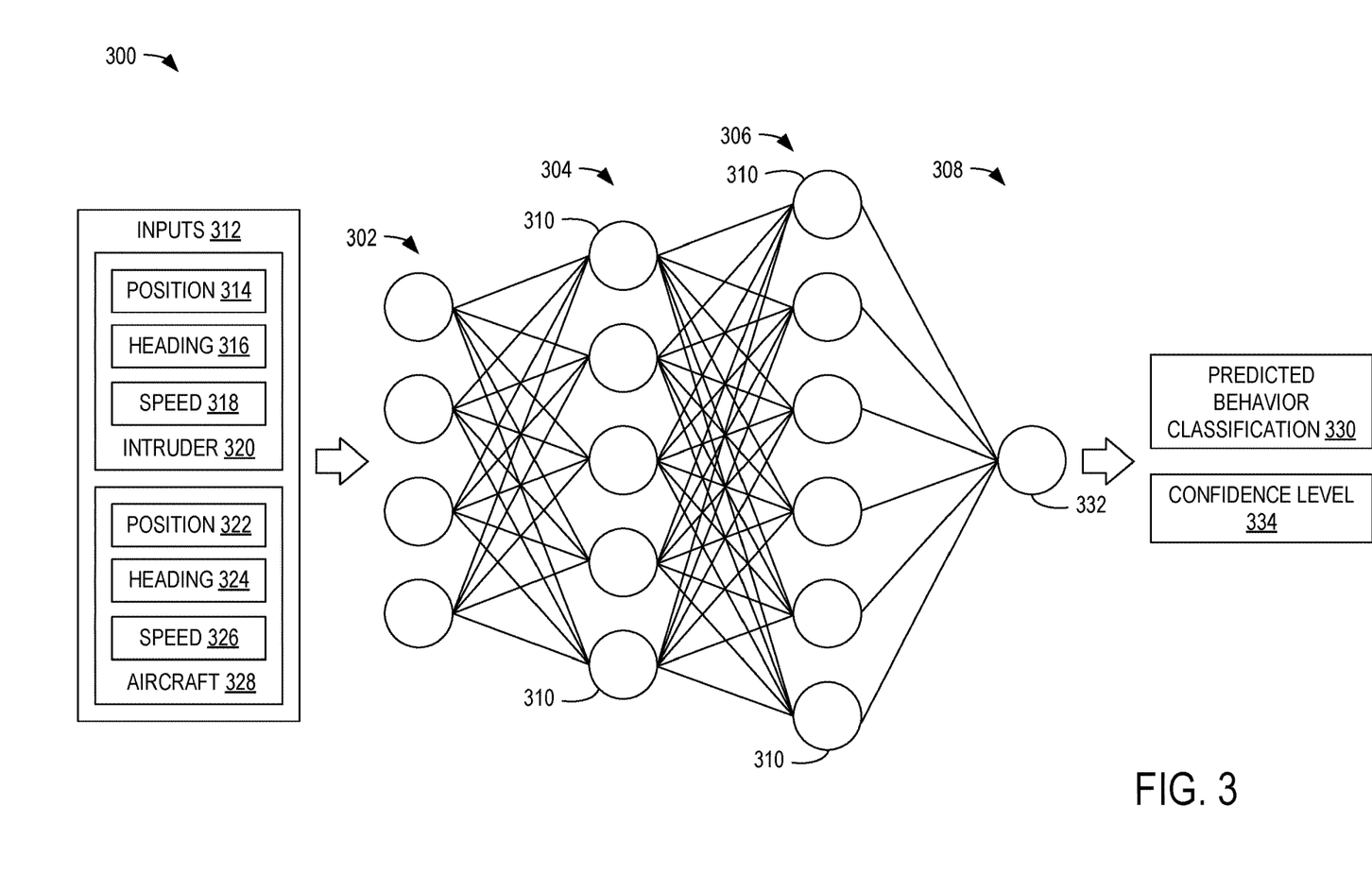
FIG. 3 shows a schematic depiction of an example fully connected feed-forward neural network that can serve as a behavior prediction model.

A neural network classifier according to the present disclosure can have any suitable architecture. FIG. 3 shows an example of a fully connected feed-forward neural network 300 as a behavior prediction model. The feed-forward neural network 300 comprises an input layer 302, two fully connected hidden layers 304 and 306, and an output layer 308. The hidden layers 304 and 306 each comprise 256 neurons 310, which are not shown in FIG. 3 for simplicity. Each neuron 310 of the hidden layers 304 and 306 comprises a leaky rectified linear unit (leaky ReLU) activation function.

The input layer 302 is configured to receive, as input 312, a position 314, a heading 316, and a speed 318 for an intruder vehicle 320, and a position 322, a heading 324, and a speed 326 for an aircraft 328. In response, the output layer 308 is configured to output a predicted behavior classification 330 based on the input 312. The output layer 308 comprises a single output neuron 332. In some examples, the output neuron 332 comprises a sigmoidal function. In other examples, the output neuron 332 comprises any other suitable type of function. Further, in other examples, input 312 can comprise any other suitable set of information.

In some other examples, the computing system comprises a recurrent neural network. The recurrent neural network receives, as inputs, a sequence of position data for the intruder vehicle and a sequence of position data for the aircraft. In this manner, the recurrent neural network is configured to use a previous state of the intruder vehicle and/or the aircraft to predict the likelihood of a collision. In yet other examples, the computing system utilizes any other suitable type of ML model, such as a convolutional neural network model. Other suitable types of ML models include long short-term memory (LSTM) and transformer models.

As described above, in some examples, the predicted behavior classification 330 represents a prediction that the aircraft 328 and the intruder vehicle 320 will collide or not. The predicted behavior classification 330 is accompanied by a confidence level 334. The confidence level 334 corresponding to a predicted collision represents an estimated probability that both the intruder vehicle and the aircraft will contemporaneously cross paths.

The predicted behavior classification may additionally or alternatively include other parameters that may be useful to predict collision risk. For example, the computing system may additionally or alternatively include a classifier configured to identify whether the intruder vehicle is aware of the aircraft (and may therefore be more likely to stop), or if the intruder vehicle is unaware of the aircraft.

With reference again to FIG. 2, the computing system 102 further comprises a decision module 126 that receives, as input, the behavior probability value 124 output by the behavior prediction module 122 and the intersection probability value 128 output by the trajectory prediction module 118. The decision module 126 is configured to output the recommended collision avoidance action 108 based at least on the intersection probability value 128 and the behavior probability value 124. This enables the aircraft to maneuver as appropriate to maintain an appropriate separation distance from the intruder vehicle.

In some examples, the decision module 126 is configured to computationally combine the intersection probability value and the behavior probability value to thereby output a collision probability value. For example, the decision module 126 may be configured to compute a conditional probability based on the intersection probability value output from the trajectory prediction module and the behavior probability model. When the intersection probability value and the behavior probability value are modeled as independent events, the collision probability value is the product of the intersection probability value and the behavior probability model. For example, a trajectory prediction that gives the intruder vehicle a 90% chance of reaching the runway and a behavior prediction that gives a 70% chance of the intruder vehicle crossing the runway may yield a collision probability value of 63%. In this manner, the trajectory prediction is scaled based upon the predicted behavior of the intruder vehicle to accurately estimate collision risk posed by the intruder vehicle. In other examples, when the intersection probability value and the behavior probability value are correlated, the collision probability value is found using the conditional probability rule.

The recommended collision avoidance action is output in some examples based at least on a determination that the collision probability value is greater than a threshold value. In some examples, the threshold value is in a range of 5% to 100%. In other examples, the threshold value is in a range of 20% to 100%. In yet other examples, the threshold value is in a range of 50% to 100%. In some other examples, a threshold value of less than 5% may be used. Further, the threshold value may be tuned based on false negative and/or false positive results.

In equations (1)-(3) below, a collision is defined as a violation of distance $d_{A\ to\ I}$ between an aircraft and an intruder vehicle projected on a 2D surface. A prediction is made for a dynamic state of the aircraft $s_A$ and a dynamic state of the intruder vehicle $s_I$ as follows in equations (1)-(3).

(1) $P_{collision} = P(d_{A\ to\ I} < d_{safe} | s_A, s_I)$ (2) $s_V = \{x_V, y_V, v_V, \psi_{V,} \ldots\}$ for $v$ in {vehicles}

(3) $\hat{P}_{reject} = P_{reject}(\text{reject} | [s_A, s_I], D)$

In some examples, the recommended collision avoidance action comprises a recommendation for the aircraft to initiate a go around maneuver or a hold maneuver. This enables the aircraft to remain spatially separated from the intruder vehicle.

As introduced above, the collision avoidance system 100 of FIGS. 1-2 is trained to output the recommended collision avoidance action 108 during a training phase. In some examples, the training phase occurs in a training environment separate from a run-time environment illustrated in the example of FIGS. 1-2. For example, the trajectory prediction module 118, the behavior prediction module 122, and the decision module 126 may be pre-trained at a computing system (e.g., a server computing device at a remote datacenter) separate from the computing system 102. In this manner, at least a portion of the training phase may be offloaded from the computing system 102.

In other examples, at least a portion of the training phase may occur concurrently or in the same environment with a run-time implementation of the collision avoidance system 100. For example, the trajectory prediction module 118, the behavior prediction module 122, and the decision module 126 may learn and adapt during the run-time implementation based on observed real-world behavior of ground vehicles and aircraft.

Figure 4:
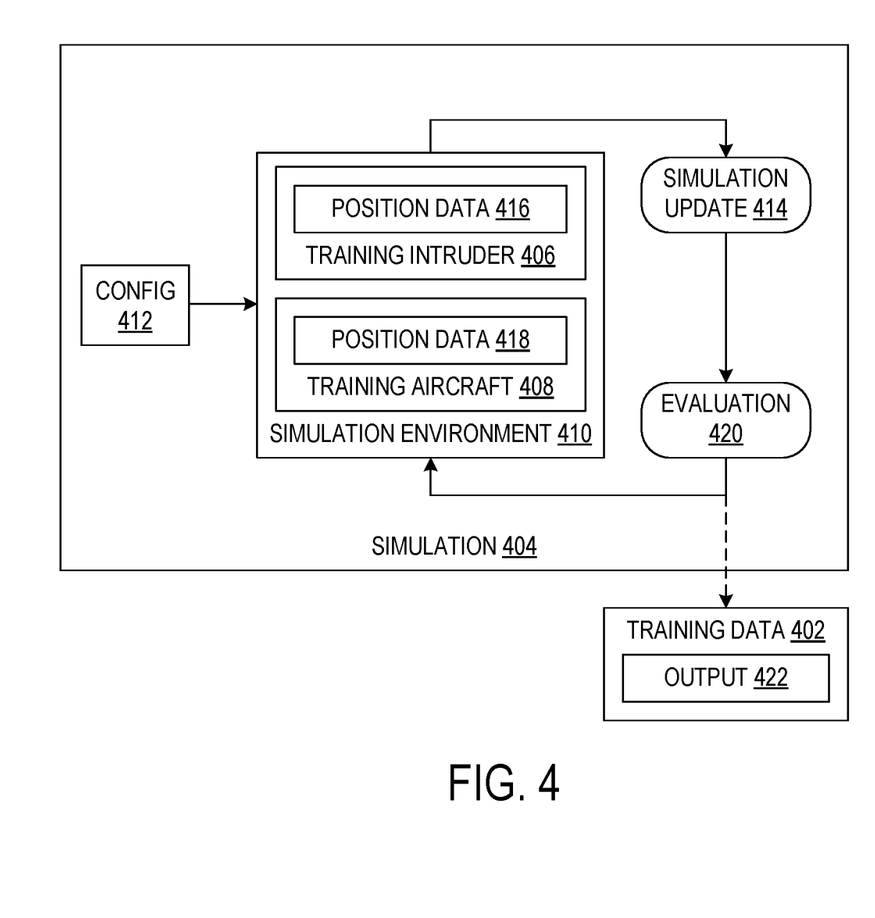
FIG. 4 shows an example of training data generated by a simulation of a training intruder vehicle and a training aircraft that can be used to train the computing system of FIG. 1 to output a recommended collision avoidance action.

In some examples, the collision avoidance system 100 is at least partially trained on simulation data. FIG. 4 shows an example of training data 402 generated by a simulation 404 of a training intruder vehicle 406 and a training aircraft 408. In some examples, the training data 402 is at least partially replaced or augmented by real-world empirical data.

The simulation 404 of FIG. 4 is a simplified two-dimensional projection of a three-dimensional collision avoidance problem. The simulation 404 includes movements of multiple intruder vehicles on a 10-kilometer×10-kilometer square simulation environment 410.

To cover a diverse set of scenarios, the simulation 404 comprises a Monte-Carlo simulation which incorporates a probabilistic behavior model for the training intruder vehicle 406. The behavior model randomizes a trajectory of the training intruder vehicle 406 and simulates both obedience and violation of traffic rules (e.g., running stop signs and hold short line requirements).

The simulation 404 is further based upon a scripted configuration file 412. The scripted configuration file 412 enables reconfiguration of the trajectories of the training intruder vehicle 406 and the training aircraft 408, parameters of the simulation, and a simulated airport layout.

In some examples, the training aircraft 408 imitates dynamics of a single-engine turboprop Cessna 208 Grand Caravan. The training aircraft 408 has different dynamics than the training intruder vehicle 406, which may represent a ground vehicle with two-dimensional car-like dynamics. The training aircraft 408 does not have similar brakes, acceleration, and steering to a ground vehicle. Instead, the training aircraft's altitude and airspeed are more relevant parameters. In some examples, parameters selected to define a turn rate and longitudinal acceleration of the training aircraft 408 are conservative and guaranteed across the full flying envelope of the aircraft.

At a simulation update module 414, the simulation 404 is configured to update position data 416 for the training intruder vehicle 406 and position data 418 of the training aircraft 408.

In some examples, the simulation 404 is executed using the following example algorithm:

```
Reset to random initials;
while t < t_max do
    • Update Intruder vehicles:
        • Call vehicle controller to compute the control
        • Set control signal to the vehicle
        • Call vehicle update to move the vehicle
    • Update agent vehicle:
        • Pass control signal to the vehicle
        • Call vehicle update to move the vehicle
    • Evaluate the state:
        • Collision
        • Termination
        • Score
    return Observation, Reward, Termination
end
```

This example algorithm assumes that the training intruder vehicle 406 is passive and does not react to any action of the training aircraft 408. Each training intruder vehicle 406 is represented as a mass-less kinematic models using the Dubin's vehicle model. Each training intruder uses a base class that takes control inputs in form of steering and acceleration commands in return for its updated position and speed. The training intruder performs turns according to commanded steering inputs and its turning radius.

The simulation 404 uses a proportional-integral-derivative (PID)-based waypoint controller that provides low-level control for the training intruder vehicle 406. The waypoint controller uses a set of waypoints defined in the configuration file 412 to generate a trajectory for the training intruder vehicle 406.

The simulation 404 further comprises an evaluation module 420. At the evaluation module 420, the position data 416 of the training intruder vehicle 406 and the position data 418 of the training aircraft are compared to a collision threshold distance. If the training intruder and the training aircraft are within the collision threshold distance, the training data 402 is flagged with a ground-truth output 422 indicating that the training intruder and the training aircraft violate the collision threshold distance. If the training intruder and the training aircraft are not within the collision threshold distance, the ground-truth output 422 indicates that the training intruder and the training aircraft are not within the collision threshold distance. In this manner, the training data 402 may be used to train a computing system to output a recommended collision avoidance action based upon position data.

Figure 5:
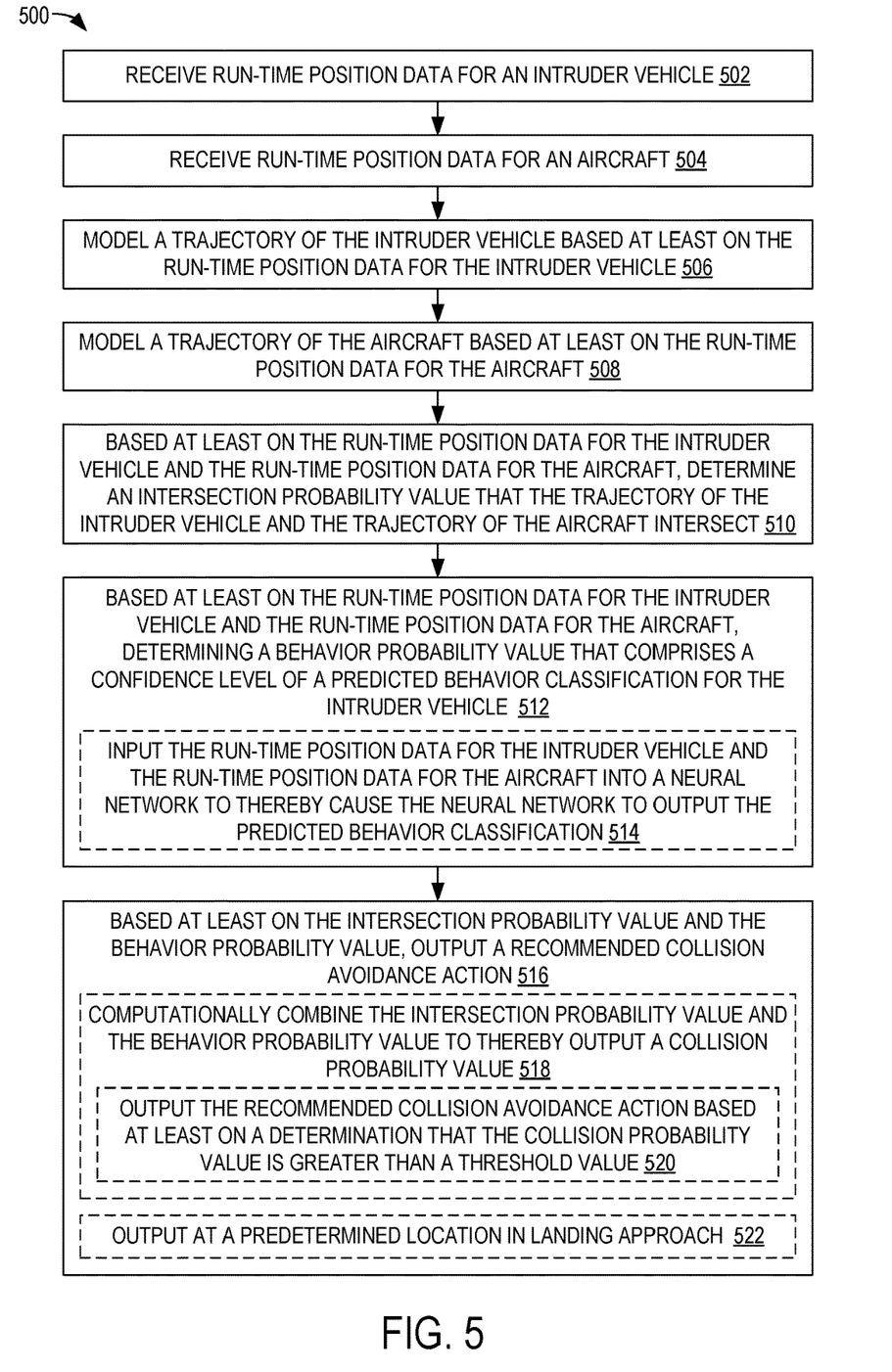
FIG. 5 shows a flow diagram depicting an example collision avoidance method.

FIG. 5 shows a flow diagram depicting an example collision avoidance method 500. The following description of the method 500 is provided with reference to the components described above and shown in FIGS. 1-4 and 6. It will be appreciated that the method 500 also can be performed in other contexts.

At 502, the method 500 comprises receiving run-time position data for an intruder vehicle. For example, the computing system 102 of FIG. 2 is configured to receive the run-time position data 110 for the intruder vehicle 106. At 504, the method 500 comprises receiving run-time position data for an aircraft. For example, the computing system 102 of FIG. 2 is configured to receive the run-time position data 112 for the aircraft 104. In this manner, the computing system obtains the run-time position data for the intruder vehicle and the aircraft.

At 506, the method 500 comprises modeling a trajectory of the intruder vehicle based at least on the run-time position data for the intruder vehicle. For example, the trajectory prediction module 118 of FIG. 2 is configured to model a trajectory of the intruder vehicle 106 based at least on the run-time position data 110. At 508, the method 500 comprises modeling a trajectory of the aircraft based at least on the run-time position data for the aircraft. For example, the trajectory prediction module 118 of FIG. 2 is configured to model a trajectory of the aircraft 104 based at least on the run-time position data 112 for the aircraft 104. At 510, the method 500 comprises, based at least on the run-time position data for the intruder vehicle and the run-time position data for the aircraft, determining an intersection probability value that the trajectory of the intruder vehicle and the trajectory of the aircraft intersect. The intersection probability value is used to determine whether to output a recommended collision avoidance action.

At 512, the method 500 comprises, based at least on the run-time position data for the intruder vehicle and the run-time position data for the aircraft, determining a behavior probability value that comprises a confidence level of a predicted behavior classification for the intruder vehicle. For example, the behavior prediction module 122 of FIG. 2 is configured to output behavior probability value 124 that represents a predicted probability that the aircraft 104 and the intruder vehicle 106 will collide.

In some examples, at 514, determining the behavior probability value comprises inputting the run-time position data for the intruder vehicle and the run-time position data for the aircraft into a neural network to thereby cause the neural network to output the predicted behavior classification. FIG. 3 shows an example of a fully connected feed-forward neural network 300 that can be used to determine the behavior probability value. In this manner, the neural network 300 can be used to predict an estimated probability that the intruder vehicle and the aircraft will not maintain suitable horizontal separation.

Continuing with FIG. 5, the method 500 further comprises, at 516, based at least on the intersection probability value and the behavior probability value, outputting a recommended collision avoidance action. For example, the intersection probability value and the behavior probability value can be used to instruct the aircraft to go around or enter a holding pattern. This enables the aircraft to remain spatially separated from the intruder vehicle.

In some examples, at 518, the method 500 comprises computationally combining the intersection probability value and the behavior probability value to thereby output a collision probability value. For example, the intersection probability value and the behavior probability value may be multiplied to thereby scale the intersection probability value by the predicted behavior probability value. As a result, the collision probability value may be a more accurate representation of the probability of a collision than the intersection probability value or the behavior probability value alone.

At 520, in some examples, the recommended collision avoidance action is output based at least on a determination that the collision probability value is greater than a threshold value. In this manner, the recommended collision avoidance action is output in response to determining that the intruder vehicle presents a collision risk for the aircraft.

As indicated at 522, in some examples, the recommended collision avoidance action is output at a "sweet spot" in a landing approach. The term "sweet spot" refers to a predetermined location (e.g. a predetermined time and/or geographic location, or predetermined range of times and/or range of geographic locations) in a landing approach. For example, the computing system 102 may be configured to determine, based upon historical landing information or modeled landing information, a predetermined time and/or a predetermined location at which there is adequate time to redirect the aircraft 104 or to instruct the aircraft 104 to continue the landing approach. Some examples of suitable landing information include performance parameters for the aircraft, specifications of a landing site (e.g., runway length and surface type), and landing conditions (e.g., weather and visibility). It can be challenging to stop the aircraft from landing if the aircraft is too close to the landing site. On the other hand, if the aircraft is far from the landing site, the intruder may have sufficient time to change course before the aircraft arrives. In some examples, one or more of steps 502-516 are performed when the aircraft within the determined sweet spot. By performing these one or more steps within the determined sweet spot, better landing results (e.g., in terms of fuel efficiency relative to performing these one or more steps at another time and/or another location) may be obtained with adequate time to allow an aircraft operator to perform the recommended collision avoidance action.

As described above, a computing system is trained to output a recommended collision avoidance action based on run-time position data for an intruder vehicle and run-time position data for an aircraft. In this manner, the recommended collision avoidance action can help maintain a suitable separation distance between the aircraft and the intruder vehicle. The recommended collision avoidance action is output based on a behavior probability value, which is an output of a machine learning classifier. In this manner, the output of the recommended collision avoidance action is at least partially based on a ML estimation of collision risk posed by the intruder vehicle. In some examples, the computing system that outputs the recommended collision avoidance action is integrated with the aircraft. This enables the aircraft to perform the methods and processes described herein in examples where it can be challenging to communicate with remote computing devices, such as in remote environments.

In some embodiments, the methods and processes described herein may be tied to a computing system of one or more computing devices. In particular, such methods and processes may be implemented in hardware as described above, as a computer-application program or service, an application-programming interface (API), a library, and/or other computer-program product.

Figure 6:
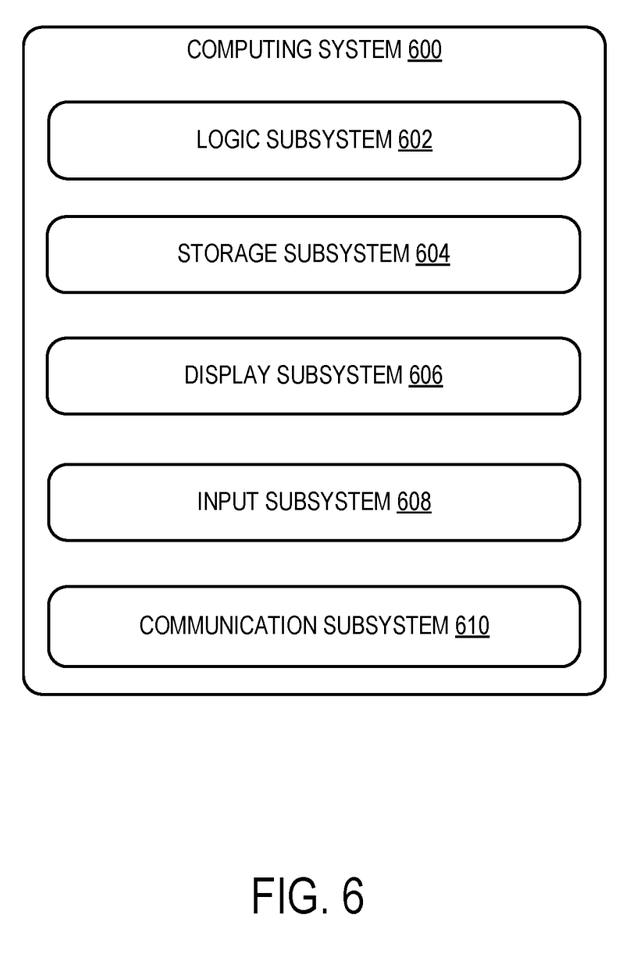
FIG. 6 schematically shows an example computing system.

FIG. 6 schematically shows a simplified representation of a computing system 600 configured to provide any to all of the compute functionality described herein. Computing system 600 may take the form of one or more personal computers, server computers, and computers integrated with aircraft, as examples. Computing system 102 is an example of computing system 600.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Storage subsystem 604 may include removable and/or built-in devices. Storage subsystem 604 may include optical memory (e.g., CD, DVD, HD-DVD, Blu-Ray Disc, etc.), semiconductor memory (e.g., RAM, EPROM, EEPROM, etc.), and/or magnetic memory, among others. Storage subsystem 604 may include volatile, nonvolatile, dynamic, static, read/write, read-only, random-access, sequential-access, location-addressable, file-addressable, and/or content-addressable devices.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 606 may be used to present a visual representation of data held by storage subsystem 604. This visual representation may take the form of a graphical user interface (GUI). As the herein described methods and processes change the data held by the storage subsystem, and thus transform the state of the storage subsystem, the state of display subsystem 606 may likewise be transformed to visually represent changes in the underlying data. Display subsystem 606 may include one or more display devices utilizing virtually any type of technology. Such display devices may be combined with the logic subsystem and the storage subsystem in a shared enclosure, or such display devices may be peripheral display devices.

When included, input subsystem 608 may comprise or interface with one or more input devices such as a keyboard and touch screen. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; and an infrared, color, stereoscopic, and/or depth camera for machine vision and/or gesture recognition.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Further, the disclosure comprises configurations according to the following clauses.

Clause 1. A computing system, comprising: a processor; and a memory storing instructions executable by the processor to receive run-time position data for an intruder vehicle; receive run-time position data for an aircraft; model a trajectory of the intruder vehicle based at least on the run-time position data for the intruder vehicle; model a trajectory of the aircraft based at least on the run-time position data for the aircraft; based at least on the run-time position data for the intruder vehicle and the run-time position data for the aircraft, determine an intersection probability value that the trajectory of the intruder vehicle and the trajectory of the aircraft intersect; based at least on the run-time position data for the intruder vehicle and the run-time position data for the aircraft, determine a behavior probability value that comprises a confidence level of a predicted behavior classification for the intruder vehicle; and based at least on the intersection probability value and the behavior probability value, output a recommended collision avoidance action.

Clause 2. The computing system of clause 1, wherein the computing system is on the aircraft.

Clause 3. The computing system of clause 1, wherein the run-time position data for the intruder vehicle comprises transponder data received from a ground vehicle.

Clause 4. The computing system of clause 1, wherein the intruder vehicle comprises another aircraft.

Clause 5. The computing system of clause 1, wherein the trajectory of the intruder vehicle is further based on a map of an airport.

Clause 6. The computing system of clause 1, wherein the instructions executable to determine the behavior probability value comprise instructions executable to cause a neural network to output the predicted behavior classification based at least on run-time position data for the intruder vehicle and the run-time position data for the aircraft.

Clause 7. The computing system of clause 6, wherein the neural network comprises a recurrent neural network.

Clause 8. The computing system of clause 1, wherein the predicted behavior classification comprises a prediction for the intruder vehicle to cross a runway.

Clause 9. The computing system of clause 1, wherein the recommended collision avoidance action comprises a recommendation for the aircraft to initiate a go around maneuver or a hold maneuver.

Clause 10. The computing system of clause 1, wherein the instructions are further executable to computationally combine the intersection probability value and the behavior probability value to thereby output a collision probability value.

Clause 11. The computing system of clause 10, wherein the instructions are further executable to output the recommended collision avoidance action based at least on a determination that the collision probability value is greater than a threshold value.

Clause 12. The computing system of clause 1, wherein the instructions are further executable to receive run-time position data for two or more intruder vehicles.

Clause 13. At a computing system, a collision avoidance method comprising: receiving run-time position data for an intruder vehicle; receiving run-time position data for an aircraft; modeling a trajectory of the intruder vehicle based at least on the run-time position data for the intruder vehicle; modeling a trajectory of the aircraft based at least on the run-time position data for the aircraft; based at least on the run-time position data for the intruder vehicle and the run-time position data for the aircraft, determining an intersection probability value that the trajectory of the intruder vehicle and the trajectory of the aircraft intersect; based at least on the run-time position data for the intruder vehicle and the run-time position data for the aircraft, determining a behavior probability value that comprises a confidence level of a predicted behavior classification for the intruder vehicle; and based at least on the intersection probability value and the behavior probability value, outputting a recommended collision avoidance action.

Clause 14. The method of clause 13, wherein determining the behavior probability value comprises inputting the run-time position data for the intruder vehicle and the run-time position data for the aircraft into a neural network to thereby cause the neural network to output the predicted behavior classification.

Clause 15. The method of clause 13, further comprising computationally combining the intersection probability value and the behavior probability value to thereby output a collision probability value.

Clause 16. The method of clause 13, further comprising outputting the recommended collision avoidance action at a predetermined location in a landing approach.

Clause 17. An aircraft, comprising: a position data receiver; one or more flight instruments, and a collision avoidance computing system comprising a processor, and a memory storing instructions executable by the processor to receive, from the position data receiver, run-time position data for a ground vehicle; receive, from the one or more flight instruments, run-time position data for the aircraft; model a trajectory of the ground vehicle based at least on the run-time position data for the ground vehicle; model a trajectory of the aircraft based at least on the run-time position data for the aircraft; based at least on the run-time position data for the ground vehicle and the run-time position data for the aircraft, determine an intersection probability value that the trajectory of the ground vehicle and the trajectory of the aircraft intersect; based at least on the run-time position data for the ground vehicle, determine a behavior probability value that comprises a confidence level of a predicted behavior classification for the ground vehicle; and based at least on the intersection probability value and the behavior probability value, output a recommended collision avoidance action.

Clause 18. The aircraft of clause 17, wherein the instructions executable to determine the behavior probability value comprise instructions executable to cause a neural network to output the predicted behavior classification based on run-time input data.

Clause 19. The aircraft of clause 17, wherein the instructions are further executable to multiply the intersection probability value and the behavior probability value to thereby output a collision probability value.

Clause 20. The aircraft of clause 19, wherein the recommended collision avoidance action is output based at least on a determination that the collision probability value is greater than a threshold value.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

The terminology "one or more of A or B" as used herein comprises A, B, or a combination of A and B. The terminology "one or more of A, B, or C" is equivalent to A, B, and/or C. As such, "one or more of A, B, or C" as used herein comprises A individually, B individually, C individually, a combination of A and B, a combination of A and C, a combination of B and C, or a combination of A, B and C.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
   a processor; and
   a memory storing instructions executable by the processor to:
     receive run-time position data for an intruder vehicle;
     receive run-time position data for an aircraft;
     model a trajectory of the intruder vehicle based at least on the run-time position data for the intruder vehicle;
     model a trajectory of the aircraft based at least on the run-time position data for the aircraft;
     based at least on the run-time position data for the intruder vehicle and the run-time position data for the aircraft, determine an intersection probability value that represents a probability that the trajectory of the intruder vehicle and the trajectory of the aircraft intersect on a runway;
     based at least on the run-time position data for the intruder vehicle, determine a behavior probability value that comprises a binary classification that represents a prediction that the aircraft and the intruder vehicle will collide or not, wherein the behavior probability value further comprises a confidence level of a predicted behavior classification for the intruder vehicle, and wherein the intersection probability value and the behavior probability value are combined to scale the intersection probability value by the behavior probability value; and
     based at least on the intersection probability value and the behavior probability value, determine a collision probability value and output a recommended collision avoidance action when the collision probability value is greater than a threshold value and when the aircraft is within a predetermined range of locations in a landing approach, and wherein the collision avoidance action enables the aircraft to maneuver to maintain a separation distance that prevents the aircraft from colliding with the intruder vehicle.

2. The computing system of claim 1, wherein the computing system is on the aircraft.

3. The computing system of claim 1, wherein the run-time position data for the intruder vehicle comprises transponder data received from a ground vehicle.

4. The computing system of claim 1, wherein the intruder vehicle comprises another aircraft.

5. The computing system of claim 1, wherein the trajectory of the intruder vehicle is further based on a map of an airport.

6. The computing system of claim 1, wherein the instructions executable to determine the behavior probability value comprise instructions executable to cause a neural network to output the predicted behavior classification based at least on the run-time position data for the intruder vehicle and the run-time position data for the aircraft.

7. The computing system of claim 6, wherein the neural network comprises a recurrent neural network.

8. The computing system of claim 1, wherein the predicted behavior classification comprises a prediction for the intruder vehicle to cross the runway.

9. The computing system of claim 1, wherein the recommended collision avoidance action comprises a recommendation for the aircraft to initiate a go around maneuver or a hold maneuver.

10. The computing system of claim 1, wherein the instructions are further executable to computationally combine the intersection probability value and the behavior probability value to thereby output the collision probability value.

11. The computing system of claim 10, wherein the threshold value is tuned based on false negative and false positive results.

12. The computing system of claim 1, wherein the instructions are further executable to receive run-time position data for two or more intruder vehicles.

13. The computing system of claim 1, wherein the predetermined range of locations is determined based upon historical landing information or modeled landing information.

14. At a computing system, a collision avoidance method comprising:
receiving run-time position data for an intruder vehicle;
receiving run-time position data for an aircraft;
modeling a trajectory of the intruder vehicle based at least on the run-time position data for the intruder vehicle;
modeling a trajectory of the aircraft based at least on the run-time position data for the aircraft;
based at least on the run-time position data for the intruder vehicle and the run-time position data for the aircraft, determining an intersection probability value that represents a probability that the trajectory of the intruder vehicle and the trajectory of the aircraft intersect on a runway;
based at least on the run-time position data for the intruder vehicle, determining a behavior probability value that comprises a binary classification that represents a prediction that the aircraft and the intruder vehicle will collide or not, wherein the behavior probability value further comprises a confidence level of a predicted behavior classification for the intruder vehicle, and wherein the intersection probability value and the behavior probability value are combined to scale the intersection probability value by the behavior probability value; and
based at least on the intersection probability value and the behavior probability value, determine a collision probability value and outputting a recommended collision avoidance action when the collision probability value is greater than a threshold value and when the aircraft is within a predetermined range of locations in a landing approach, and wherein the collision avoidance action enables the aircraft to maneuver to maintain a separation distance that prevents the aircraft from colliding with the intruder vehicle.

15. The method of claim 14, wherein determining the behavior probability value comprises inputting the run-time position data for the intruder vehicle and the run-time position data for the aircraft into a neural network to thereby cause the neural network to output the predicted behavior classification.

16. The method of claim 14, further comprising computationally combining the intersection probability value and the behavior probability value to thereby output the collision probability value.

17. An aircraft, comprising:
a position data receiver;
one or more flight instruments, and
a collision avoidance computing system comprising
a processor, and
a memory storing instructions executable by the processor to:
receive, from the position data receiver, run-time position data for a ground vehicle;
receive, from the one or more flight instruments, run-time position data for the aircraft;
model a trajectory of the ground vehicle based at least on the run-time position data for the ground vehicle;
model a trajectory of the aircraft based at least on the run-time position data for the aircraft;
based at least on the run-time position data for the ground vehicle and the run-time position data for the aircraft, determine an intersection probability value that represents a probability that the trajectory of the ground vehicle and the trajectory of the aircraft intersect on a runway;
based at least on the run-time position data for the ground vehicle, determine a behavior probability value that comprises a binary classification that represents a prediction that the aircraft and the ground vehicle will collide or not, wherein the behavior probability value further comprises a confidence level of a predicted behavior classification for the ground vehicle, and wherein the intersection probability value and the behavior probability value are combined to scale the intersection probability value by the behavior probability value; and
based at least on the intersection probability value and the behavior probability value, determine a collision probability value and output a recommended collision avoidance action when the collision probability value is greater than a threshold value and when the aircraft is within a predetermined range of locations in a landing approach, and wherein the collision avoidance action enables the aircraft to maneuver to maintain a separation distance that prevents the aircraft from colliding with the ground vehicle.

18. The aircraft of claim 17, wherein the instructions executable to determine the behavior probability value comprise instructions executable to cause a neural network to output the predicted behavior classification based at least on the run-time position data for the ground vehicle and the run-time position data for the aircraft.

19. The aircraft of claim 17, wherein the instructions are further executable to multiply the intersection probability value and the behavior probability value to thereby output the collision probability value.

20. The aircraft of claim 19, wherein the threshold value is tuned based on false negative and false positive results.

* * * * *